United States Patent
Yoshikawa et al.

(10) Patent No.: US 8,007,213 B2
(45) Date of Patent: Aug. 30, 2011

(54) ATTACHMENT FOR MACHINE TOOL

(75) Inventors: Mutsumi Yoshikawa, Ritto (JP);
Takayuki Kume, Ritto (JP); Keiji Tomimatsu, Ritto (JP); Hiroyuki Yamamura, Ritto (JP); Isamu Takehana, Ritto (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 839 days.

(21) Appl. No.: 12/000,453

(22) Filed: Dec. 12, 2007

(65) Prior Publication Data

US 2008/0199270 A1    Aug. 21, 2008

(30) Foreign Application Priority Data

Feb. 15, 2007   (JP) ................................ 2007-034276

(51) Int. Cl.
*B23C 1/12* (2006.01)
(52) U.S. Cl. .................... 409/230; 409/215; 409/216
(58) Field of Classification Search .................. 409/230, 409/144, 201, 211, 216, 215; 408/236
See application file for complete search history.

(56) References Cited

U.S. PATENT DOCUMENTS

| | | | | |
|---|---|---|---|---|
| 3,757,637 A * | 9/1973 | Eich et al. | ..................... | 409/230 |
| 4,384,811 A * | 5/1983 | Eckstein et al. | ............. | 409/230 |
| 4,614,468 A * | 9/1986 | Waldrich et al. | ............. | 409/211 |
| 4,709,455 A * | 12/1987 | D'Andrea et al. | ............. | 409/144 |
| 5,017,063 A * | 5/1991 | Tsay | .............................. | 409/216 |
| 5,697,739 A * | 12/1997 | Lewis et al. | ..................... | 409/230 |
| 5,823,722 A * | 10/1998 | Takenaka | ....................... | 409/230 |
| 6,450,074 B1 * | 9/2002 | Yong-Chang | ................. | 409/230 |
| 6,554,551 B1 * | 4/2003 | Marelli | ......................... | 409/201 |
| 6,746,188 B2 * | 6/2004 | Watanabe | ..................... | 409/201 |
| 6,832,880 B2 * | 12/2004 | Colombo | ...................... | 409/230 |

FOREIGN PATENT DOCUMENTS

| | | |
|---|---|---|
| CN | 2827621 Y | 10/2006 |
| JP | 3-121735 A | 5/1991 |
| JP | 5-138411 A | 6/1993 |
| JP | 2731992 B2 * | 6/1993 |
| JP | 5-285787 A | 11/1993 |
| JP | 3407900 B2 * | 11/1993 |
| JP | 6-17838 A | 3/1994 |
| JP | 2556950 Y2 * | 3/1994 |
| JP | 9-131637 A | 5/1997 |
| JP | 2003-340678 A * | 12/2003 |

* cited by examiner

*Primary Examiner* — Erica E Cadugan
(74) *Attorney, Agent, or Firm* — Birch, Stewart, Kolasch & Birch, LLP

(57) ABSTRACT

When a horizontal shaft and a piston are caused to travel to a first side with a gear coupling engaging, the revolution of the piston is designed to be restricted by meshing a spur gear with an internal gear fixed to a main body of a horizontal swivel part. On the other hand, when the horizontal shaft and the piston are caused to travel to a second side and the gear coupling thus disengages, the horizontal shaft and the piston are designed to be revolved in an integrated manner by meshing spur gears respectively with other spur gears. When the horizontal shaft and the piston travel from the first side to the second side, the spur gear is designed to be spaced away from the internal gear after the spur gear meshes with the spur gear.

3 Claims, 5 Drawing Sheets

ATTACHMENT FOR MACHINE TOOL

BACKGROUND OF THE INVENTION

1. Field of the Invention

The present invention relates to an attachment attached detachably to a main spindle of a machine tool.

2. Description of Related Art

A machine tool for machining is designed to perform various cutting processes with various types of tools attached normally to the nose of its own main spindle depending on the necessity. Furthermore, a machine tool is designed to perform cutting processes on workpieces in a direction different from the direction in which the axis of its main spindle extends by attaching an attachment to the nose of its main spindle additionally. The attachment has an attachment main spindle which is arranged in a direction which crosses over the axis of the main spindle of the machine tool. A variety of tools are detachably attached to the nose of the attachment main spindle. When the attachment is attached to the main spindle of the machine tool, the attachment main spindle is revolvably driven in linkage with the main spindle of the machine tool, and thereby the machine tool performs a cutting process.

By attaching an attachment to the main spindle of the machine tool in the foregoing manner, the direction of the attached tool can be changed. Accordingly, the machine tool is capable of performing a wider range of cutting processes and of performing a cutting process on a workpiece which can hardly be processed by a tool attached normally to the machine tool's own main spindle.

In addition, when an attachment is attached to the main spindle of the machine tool, the appropriate one is selected from various attachments such as a right-angle head, a universal head (Japanese Patent No. 2731992, Japanese Patent No. 3407900, and Japanese Utility Model No. 2556950) or the like, in view of the shape of the workpiece, a direction in which the process surface of the workpiece extends, restrictions the cutting edge diameter of the tool which is going to be used, and the like.

An attachment such as a right-angle head or a universal head makes it possible to index the attached tool in the horizontal plane by swiveling itself about a vertical shaft. Furthermore, an attachment such as a universal head is one to which a tool is attached revolvably in multiple directions, for allowing greater flexibility in processing position of the attached tool than an attachment such as a right-angle head. In other words, the attachment such as a universal head makes it possible to index the attached tool in the vertical plane by swiveling its attachment main spindle about a horizontal shaft.

However, in the case of an attachment such as a universal head, when the attachment main spindle switches from a revolving state to a state of swiveling in the vertical plane, the gear coupling in the indexing mechanism disengages. This causes a condition in which the attachment main spindle does not mesh with any gear at all (a neutral condition) until the gear of the horizontal shaft meshes with an indexing gear. As a result, it is likely that the tool attached to the horizontal shaft with the attachment main spindle interposed in between may swivel in the vertical plane in an unintentional direction due to its own weight and cause a wrong indexing.

SUMMARY OF THE INVENTION

With this situation taken into consideration, the present invention attempts to solve the foregoing problem. An object of the present invention is to provide an attachment for a machine tool which is capable of preventing a tool from being wrongly indexed when the attachment main spindle switches from a revolving state to a state of swiveling in the vertical plane.

An attachment for a machine tool according to a first aspect of the invention made for the purpose of solving the foregoing problem provides an attachment detachably attached to a nose of a main spindle of the machine tool. The attachment is characterized by including: an internal rotary shaft to which a revolution of the main spindle is transmitted; an external rotary shaft, arranged coaxially with the internal rotary shaft, for revolvably supporting the internal rotary shaft in its center hole, a main body for revolvably supporting the internal and external rotary shafts; an attachment main spindle, arranged in a direction which crosses over the axis of the internal rotary shaft, revolvably driven by a revolution of the internal rotary shaft, and a tool being detachably attached to the nose of the attachment main spindle; a swivel part for revolvably supporting the attachment main spindle, the swivel part being swiveled by the revolutions of the internal and external rotary shafts, indexing means for causing the main body and the swivel part to disengageably engage with each other, and thus swiveling the swivel part relative to the main body for indexation; traveling means for traveling the internal and external rotary shafts in their respective axial directions; restricting means for restricting the revolution of the external rotary shaft when the traveling means travels the internal and external rotary shafts to a first side with the indexing means engaging; and connecting means for connecting the internal and external rotary shafts to each other when the indexing means disengages after the traveling means travels the internal and external rotary shafts to a second side. The attachment is characterized in that, when the internal and external rotary shafts travel from the first side to the second side, the restricting means stops restricting the external rotary shaft after the internal and external rotary shafts are connected to each other by the connecting means.

An attachment for a machine tool according to a second aspect of the invention made for the purpose of solving the foregoing problem provides the attachment for a machine tool according to the first aspect of the invention characterized in that the restricting means includes: a rotary-shaft-side gear provided to the external rotary shaft; and a main-body-side gear which is provided to the main body, and which meshes with the rotary-shaft-side gear, the connecting means is revolution transmitting gears for transmitting a revolution from an internal-rotary-shaft gear provided to the internal rotary shaft to an external-rotary-shaft gear provided to the external rotary shaft, and when the internal and external rotary shafts travel from the first side to the second side, the rotary-shaft-side gear spaces away from the main-body-side gear after the external-rotary-shaft gear meshes with the revolution transmitting gears which have meshed with the internal-rotary-shaft gear.

An attachment for a machine tool according to a third aspect of the invention made for the purpose of solving the foregoing problem provides the attachment for a machine tool according to any one of the first and second aspects of the invention, characterize in that the main body is a horizontal swivel part for swiveling the tool in the horizontal plane for indexation by revolving about a vertical shaft, and the swivel part is a vertical swivel part for swiveling the tool in the vertical plane for indexation by revolving about a horizontal shaft.

DETAILED DESCRIPTION OF THE INVENTION

Detailed descriptions will be provided below for the attachment for a machine tool according to the present invention by use of the drawings.

First of all, descriptions will be provided for an attachment which is termed as a universal head, and to which a configuration according to the present invention is applied, by use of FIGS. 1 to 4.

Figure 1:
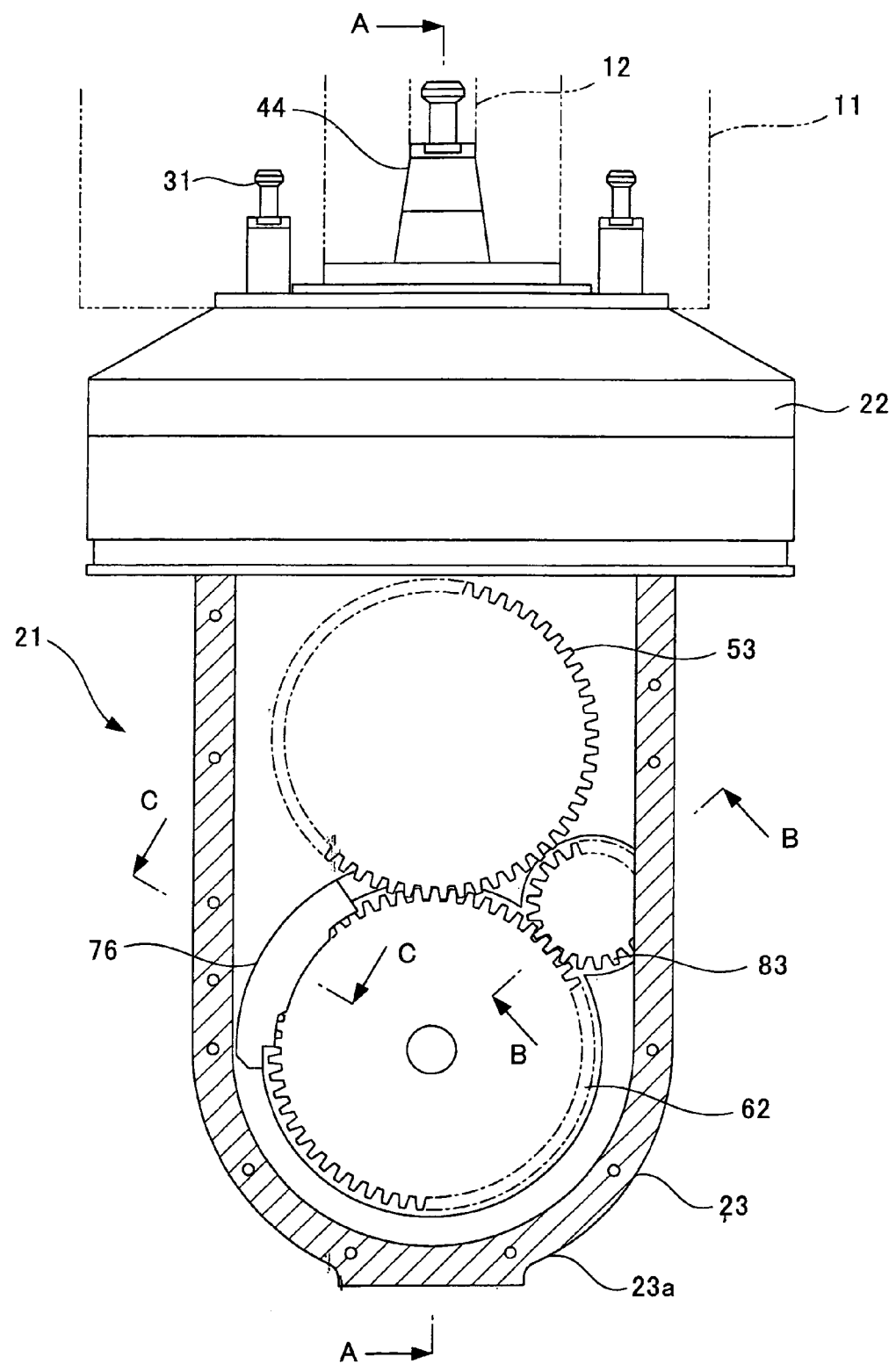
FIG. 1 shows a cross-sectional view of a lower portion and its vicinity of an attachment for a machine tool according to an embodiment of the present invention.
Figure 2:
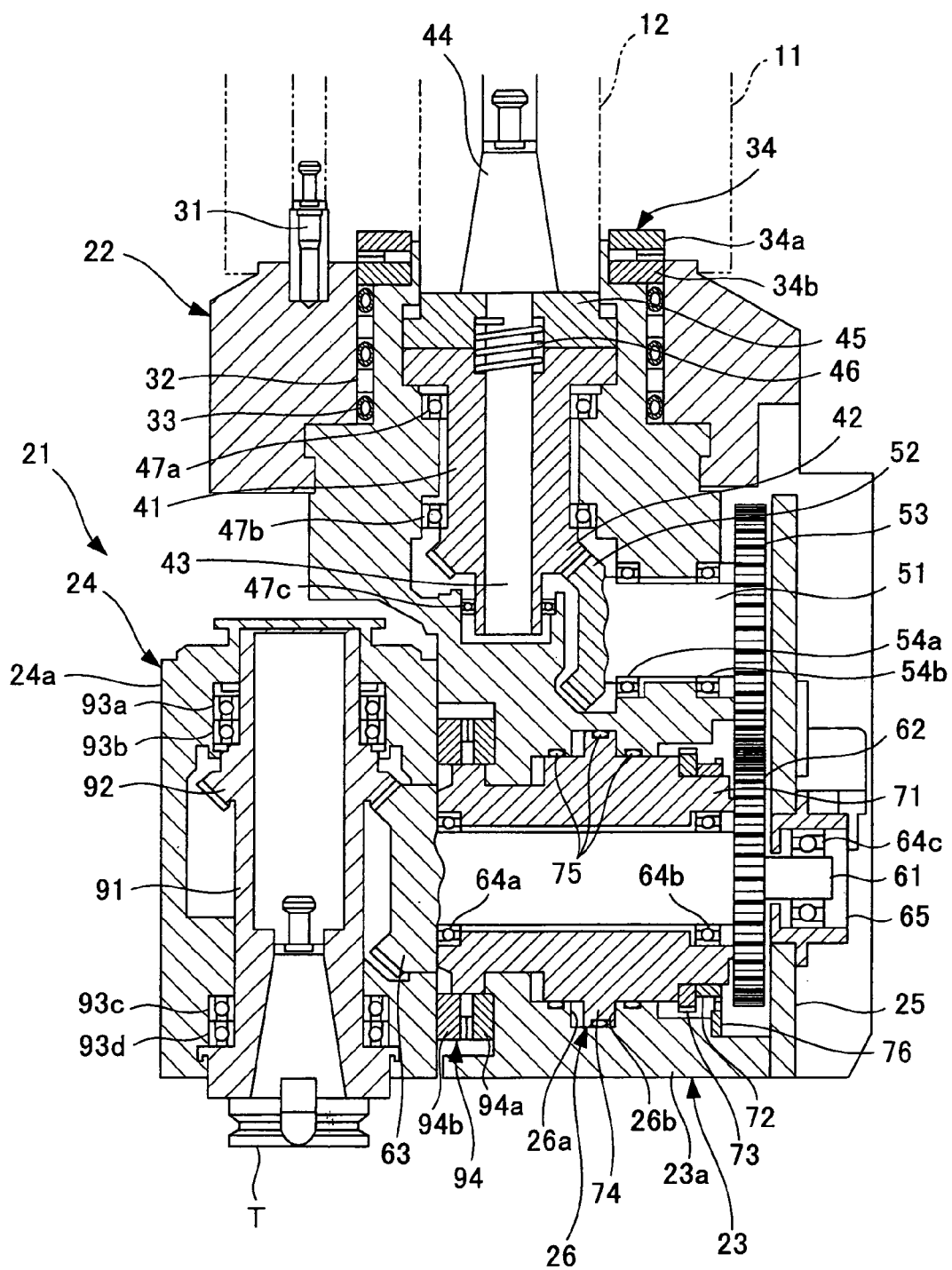
FIG. 2 shows a cross-sectional view of the attachment for a machine tool, with an attachment main spindle revolving, taken along the A-A line indicated by arrows A of FIG. 1.

As shown in FIGS. 1 and 2, a machine tool (not illustrated) as an upright machining center is provided with a ram 11. A cylindrical main spindle 12 is revolvably supported in the ram 11. A main spindle driving motor (not illustrated) is mechanically connected to the main spindle 12. In other words, the main spindle 12 is revolvably driven by a drive of the main spindle driving motor.

An attachment 21 is detachably attached to the lower surface of the ram 11. The attachment 21 includes: a fixed table part 22 to be fixed to the lower surface of the ram 11; a horizontal swivel part 23 supported slidably and revolvably relative to an inner surface of this fixed table part 22; and a vertical swivel part 24 supported slidably and revolvably relative to the side surface of the this horizontal swivel part 23.

The fixed table part 22 is provided with a clamp shaft 31 for fixing the fixed table part 22 to the ram 11. The clamp shaft 31 is designed to be clamped or unclamped by a fixed-table-part clamping apparatus (not illustrated) provided in the ram 11. In other words, by clamping the clamp shaft 31 of the fixed table part 22, the attachment 21 is lifted and thus attached to the ram 11. By unclamping the clamp shaft 31, the attachment 21 is caused to descend away, and thus detached, from the ram 11 so that the attachment 21 is put in a state of being suspended.

An upper portion of a main body 23a of the horizontal swivel part 23 is fitted into the inner peripheral surface of the fixed table part 22. Multiple O-ring 33 are provided to the outer peripheral surface of the main body 23a fitted into the inner peripheral surface of the fixed table part 22. Lubricating oil grooves 32 are formed in interstices each among the fixed table part 22, the main body 23a and two neighboring o-ring 33. A hydraulic pressure is supplied from a hydraulic pressure supplying apparatus (not illustrated) to the lubricating oil grooves 32. As a result, in a case where the main body 23a of the horizontal swivel part 23 slidingly revolves relative to the inner peripheral surface of the fixed table part 22, the o-ring 33 slidingly contact the inner peripheral surface of the fixed table part 22. The hydraulic pressure in each lubricating oil groove 32 is sealed with the two corresponding O-ring 33.

A gear coupling 34 is provided to the interstice between the lower surface of the ram 11 and the upper surface of the main body 23a of the horizontal swivel part 23. The gear coupling 34 is configured of: a fixing-side gear coupling 34a provided to the ram 11; and an indexing-side gear coupling 34b provided to the horizontal swivel part 23. Each of the gear couplings 34a and 34b is a ring-shaped circular plate with teeth formed on its one surface. The gear couplings 34a and 34b are capable of indexing a tool by meshing tooth tips of one gear coupling with spaces of the other gear coupling while revolving.

A cylindrical vertical shaft 41 is provided to the horizontal swivel part 23 in the vertical direction. The vertical shaft 41 is revolvably supported by the main body 23a with bearings 47a, 47b and 47c interposed in between. A bevel gear 42 is formed in the lower end of the vertical shaft 41. A rotary shaft 43, which is arranged coaxially with the main spindle 12, is fitted into the center hole of the bevel gear 42 slidably in the axial direction thereof.

A clamp shaft 44, which is detachably attached to the nose of the main spindle 12, is formed in the upper end of the rotary shaft 43. The clamp shaft 44 is designed to be clamped or unclamped by a horizontal-swivel-part clamping apparatus (not illustrated) provided in the center hole of the main spindle 12.

A ring-shaped supporting member 45 is provided to the interstice between the upper surface of the vertical shaft 41 and the lower surface of the clamp shaft 44. The rotary shaft 43 is slidably fitted into the center hole of the supporting member 45 in the axial direction thereof. A Belleville spring 46 is provided to the interstice between the supporting member 45 and an upper-end periphery of the vertical shaft 41. The Belleville spring 46 is arranged in a state of being compressed between the vertical shaft 41 and the supporting member 45. A pressing force of this Belleville spring 46 puts the rotary shaft 43 and the clamp shaft 44 in a state of being pressed upward with the supporting member 45 interposed in between.

In addition, the horizontal swivel part 23 is provided with an intermediate shaft 51 in the horizontal direction. The intermediate shaft 51 is revolvably supported by the main body 23a with bearings 54a and 54b interposed in between. A bevel gear 52 is formed in one end of the intermediate shaft 51, whereas a spur gear 53 is formed in the other end of the intermediate shaft 51. The bevel gear 52 meshes with the bevel gear 42 of the vertical shaft 41.

Furthermore, the horizontal swivel part 23 is provided with a horizontal shaft 61 and a piston 71 in the horizontal direction. The horizontal shaft 61 and the piston 71 are arranged coaxially with each other, and the horizontal shaft 61 is fitted into the center hole of the piston 71.

The horizontal shaft 61 is revolvably supported in the center hole of the piston 71 with bearings 64a and 64b interposed in between. A supporting plate 25 of the horizontal swivel part 23 is provided to a first end of the horizontal shaft 61 in a standing manner. A cylindrical bearings box 65 is supported by this supporting plate 25. The first end of the horizontal shaft 61 is revolvably supported in the bearings box 65 with bearings 64c interposed in between. Moreover, the bearings 64c are slidably supported by the inner peripheral surface of the bearings box 65 in the axial direction thereof Furthermore, a spur gear 62 is formed in the first end of the horizontal shaft 61 whereas a bevel gear 63 is formed in a second end of the horizontal shaft 61.

On the other hand, the piston 71 is arranged between the spur gear 62 and the bevel gear 63 outside the horizontal shaft 61. Multiple O-rings 75 are provided in the outer side the piston 71. As a result, in a case where the piston 71 slidingly revolves relative to the inner peripheral surface of the main body 23a and slidingly travels in the axial direction, the O-rings 75 slidingly contacts the inner peripheral surface of the main body 23a. In addition, spur gears 72 and 73 as well as a piston part 74 are formed in the outer peripheral surface of the piston 71.

Figure 5:
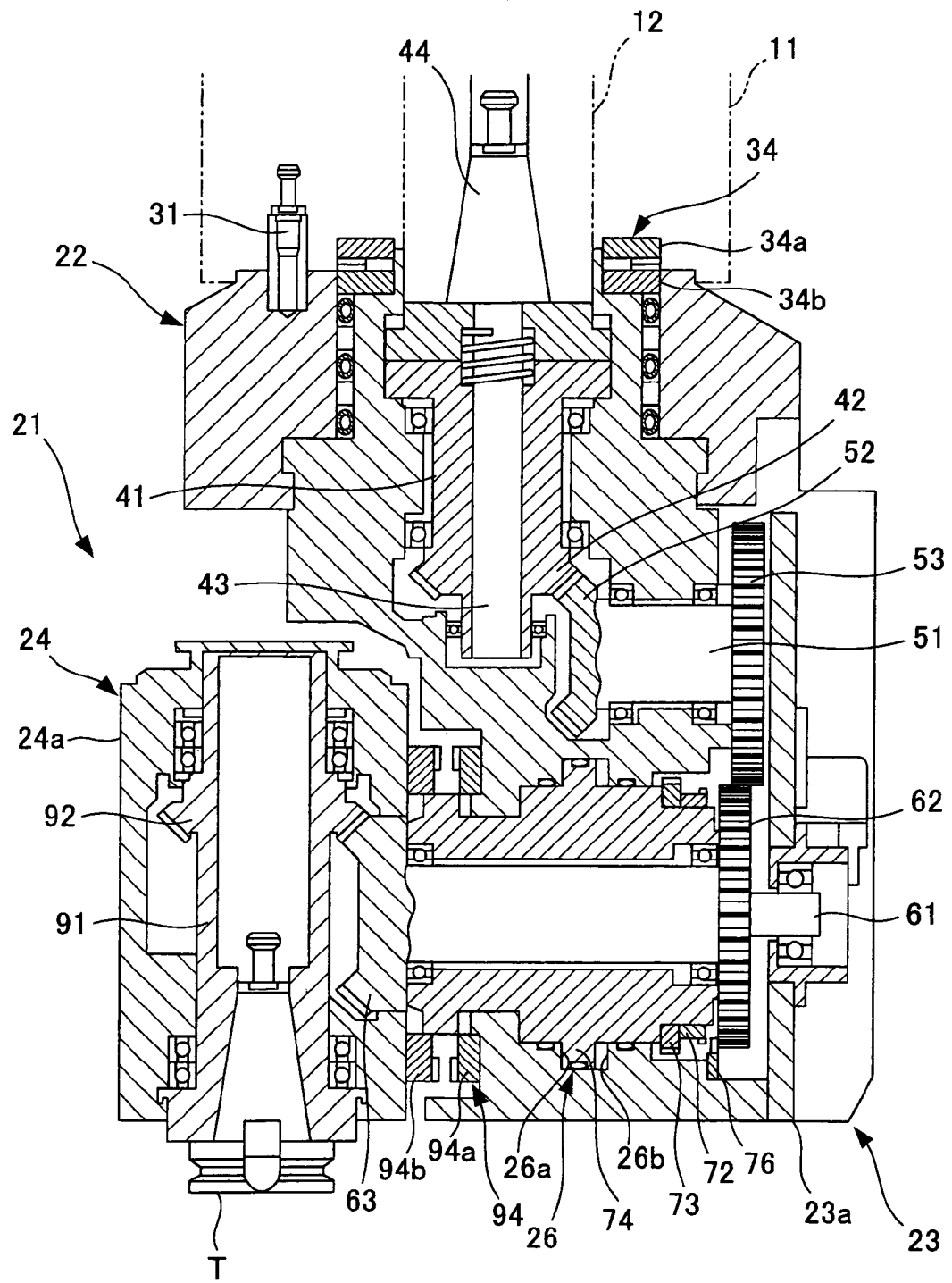
FIG. 5 shows a cross-sectional view of the attachment for a machine tool, with the attachment main spindle swiveling in the vertical plane, taken along the A-A line indicated by arrows A of FIG. 1.

The spur gear 72 meshes with an internal gear 76 which is fixed to the main body 23a (see FIG. 5). The internal gear 76 is an arc-shaped plate material with teeth formed on its inner peripheral surface. The internal gear 76 is arranged coaxially with the spur gear 72 of the piston 71, and meshes with part of the spur gear 72. Furthermore, the spur gear 73 has a pitch-circle diameter equal to that of the spur gear 62 of the horizontal shaft 61.

The piston part 74 slides in its axial direction inside a cylinder part 26 formed in the main body 23a. Two hydraulic chambers 26a and 26b, which are separated away from each other by the piston part 74, are formed inside the cylinder part 26. The hydraulic chambers 26a and 26b are connected to the hydraulic pressure supplying apparatus (not illustrated). By operating this hydraulic pressure supplying apparatus, a hydraulic pressure is supplied to, or drained from, the hydraulic chambers 26a and 26b.

In other words, once the hydraulic pressure is supplied to the hydraulic chamber 26a, the horizontal shaft 61 and the piston 71 travel to the right in FIG. 2 in an integrated manner, as shown in FIG. 2. On the other hand, once the hydraulic pressure is supplied to the hydraulic chamber 26b, the horizontal shaft 61 and the piston 71 similarly travel to the left in FIG. 2 (see FIG. 5). It should be noted that the hydraulic pressure in each of the hydraulic chambers 26a and 26b are sealed with the O-rings 75.

Figure 3:
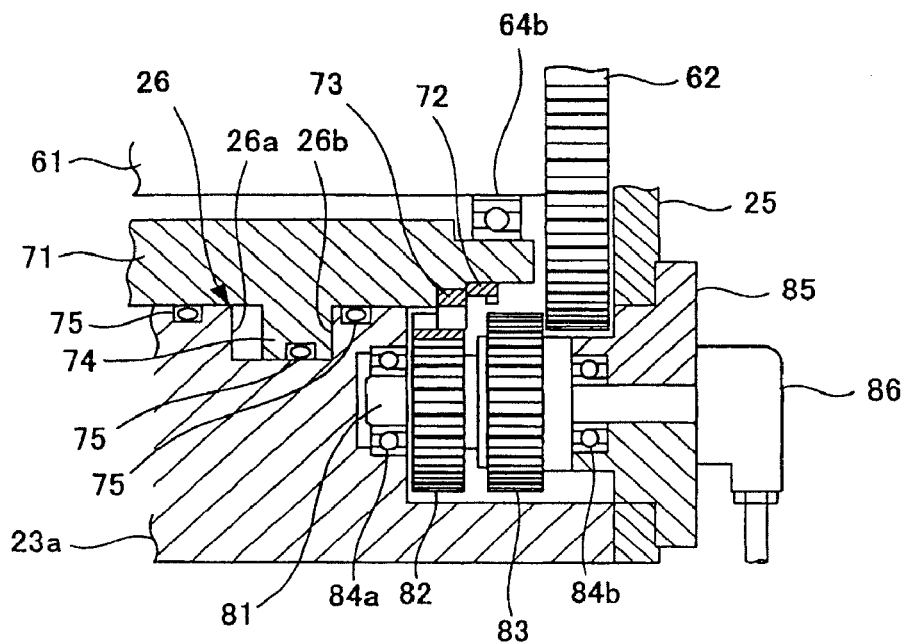
FIG. 3 shows a cross-sectional view of the attachment for a machine tool, with the attachment main spindle revolving, taken along the B-B line indicated by arrows B of FIG. 1.

Moreover, as shown in FIG. 3, the horizontal swivel part 23 is provided with a horizontal shaft 81 in the horizontal direction. Spurs gears 82 and 83, whose pitch-circle diameters are equal to each other, are fixed to the horizontal shaft 81 with the spur gears 82 and 83 being placed next to each other. The spur gear 82 meshes with the spur gear 73 of the piston 71 whereas the spur gear 83 meshes with the spur gear 62 of the horizontal shaft 61. The horizontal shaft 81 is revolvably supported by the main body 23a with bearings 84a interposed in between, and is revolvably supported by a fixed member 85 fixed to the supporting plate 25 with bearings 84b interposed in between. Additionally, an encoder 86 fixed to the fixed member 85 is connected to one end of the horizontal shaft 81.

Figure 4:
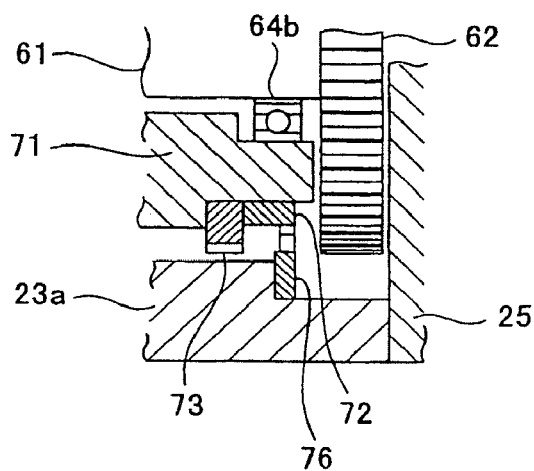
FIG. 4 shows a cross-sectional view of the attachment for a machine tool, with the attachment main spindle revolving, taken along the C-C line indicated by arrows C of FIG. 1.

As a result, although details will be described later, when the horizontal shaft 61 and the piston 71 travel to the right in FIG. 2, as shown in FIG. 2, by supplying the hydraulic chamber 26a with the hydraulic pressure (an attachment main spindle 91 is put in a state of revolving), the spur gear 62 of the horizontal shaft 61 and the spur gear 83 of the horizontal shaft 81 do not mesh with each other whereas the spur gear 72 of the piston 71 meshes with the internal gear 76 of the main body 23a, and the spur gear 73 of the piston 71 meshes with the spur gear 82 of the horizontal shaft 81, as shown in FIGS. 3 and 4.

On the other hand, when the horizontal shaft 61 and the piston 71 travel to the left in FIG. 2 by supplying the hydraulic chamber 26b with the hydraulic pressure (see FIG. 5) (the attachment main spindle 91 is put in a state of swiveling in the vertical plane), the spur gear 62 of the horizontal shaft 61 meshes with the spur gear 83 of the horizontal shaft 81 whereas the spur gear 72 of the piston 71 and the internal gear 76 of the main body 23a do not mesh with each other, and the spur gear 73 of the piston 71 meshes with the spur gear 82 of the horizontal shaft 81.

The vertical swivel part 24 is provided with the cylindrical attachment main spindle 91 in the vertical direction. This attachment main spindle 91 is revolvably supported by the main body 24a with bearings 93a, 93b, 93c and 93d interposed in between. A bevel gear 92 is formed on the outer peripheral surface of the attachment main spindle 91. This bevel 92 meshes with the bevel gear 63 of the horizontal shaft 61. In addition, a tool T is detachably attached to the center hole of the attachment main spindle 91. This attached tool T is designed to be clamped or unclamped by a tool clamping apparatus (not illustrated) provided inside the center hole of the attachment main spindle 91.

A gear coupling 94 is provided to the interstice between the horizontal swivel part 23 and the vertical swivel part 24. The gear coupling 94 is configured of: a fixing-side gear coupling 94a provided to the horizontal swivel part 23; and an indexing-side gear coupling 94b provided to the vertical swivel part 24. Each of the gear couplings 94a and 94b is a ring-shaped circular plate with teeth formed on its surface. The gear couplings 94a and 94b are capable of indexing a tool by meshing tooth tips of one gear coupling with spaces of the other gear coupling while revolving.

Descriptions will be provided next for how to attach the attachment 21 to the ram, and how to index (swivel) the tool T.

First of all, in a case of performing processing with the tool T attached to the attachment 21, the clamp shaft 44 of the horizontal swivel part 23 is fitted and clamped into the center hole of the main spindle 12. Concurrently, the fixing-side gear coupling 34a and the indexing-side gear coupling 34b of the gear coupling 34 are meshed with each other at a predetermined indexing angle. By clamping the clamp shaft 31 of the fixed table part 22 inside the ram 11 while keeping this state, the attachment 21 is attached to the ram 11.

Subsequently, the main spindle 12 is revolved. Thereby, the vertical shaft 41 along with the rotary shaft 43 and the clamp shaft 44 is revolved. This revolution of the vertical shaft 41 causes the revolution of the intermediate shaft 51 through the bevel gears 42 and 52 that mesh with each other. In response to this, the horizontal shaft 61 is revolved through the spur gears 51 and 62 that mesh with each other.

At this time, because the hydraulic chamber 26a in the cylinder 26 is supplied with the hydraulic pressure, the horizontal shaft 61 and the piston 71 are caused to travel to the right in FIG. 2 in an integrated manner, as shown in FIG. 2. Thereby, as shown in FIGS. 3 and 4, the spur gear 62 of the horizontal shaft 61 and the spur gear 83 of the horizontal shaft 81 do not mesh with each other whereas the spur gear 72 of the piston 71 meshes with the internal gear 76 of the main body 23a, and the spur gear 73 of the piston 71 meshes with the spur gear 82 of the horizontal shaft 81.

In addition, once the horizontal shaft 61 and the piston 71 travel, the vertical swivel part member 24 is designed to travel in the same direction with the bevel gear 92 of the attachment main spindle 91 being meshed with the bevel gear 63 of the horizontal shaft 61. This puts the fixing-side gear coupling 94a and the indexing-side gear coupling 94b of the gear coupling 94 in the state of being meshed with each other.

Consequently, the revolution of the piston 71 is restricted, and only the horizontal shaft 61 is allowed to revolve. As a result, the mesh of the bevel gears 63 and 92 therewith revolves the attachment main spindle 91 because of the mesh of the gear coupling 94. The tool T is revolved by the revolution of this attachment main spindle 91, and thus processing is performed.

Subsequently, in a case where the tool T is intended to be indexed in the horizontal plane, the clamp shaft 31 of the fixed table part 22 is unclamped with the clamp shaft 44 of the horizontal swivel part 23 remaining clamped. Thereby, the entire attachment 21 descends with the clamp shaft 44 attached to the main spindle 12, and thus the fixing-side gear coupling 34a and the indexing-side gear coupling 34b in the gear coupling 34 come out of mesh with each other.

Afterward, the main spindle is revolved. Thereby, the vertical shaft 41 along with the rotary shaft 43 and the clamp shaft 44 is revolved. At this time, because the gear coupling 34 is out of mesh, the revolution of the vertical shaft 41 is transmitted to the main body 23a of the horizontal swivel part 23, and thus the horizontal swivel part 23 swivels about the vertical shaft 41 in the horizontal plane.

Subsequently, the horizontal swivel part 23 swivels at a predetermined swivel angle, and thereafter the entire attachment 21 is lifted with the clamp shaft 31 of the fixed table part 22 clamped. This meshes the fixing-side gear coupling 34a and the indexing-side gear coupling 34b of the gear coupling 34 with each other at a predetermined indexing angle. Thereby, the attachment 21 is attached to the ram 11. Thus, the tool T is indexed in the horizontal plane.

Figure 7:
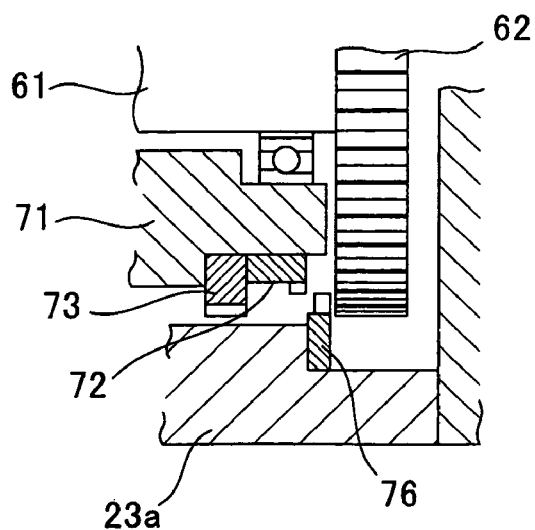
FIG. 7 shows a cross-sectional view of the attachment for a machine tool, with the attachment main spindle swiveling in the vertical plane, taken along the C-C line indicated by arrows C of FIG. 1.

After that, in a case where the tool T is intended to be indexed in the vertical plane, as shown in FIGS. 5 and 7, the main spindle 12 is revolved with the attachment 21 attached to the ram. Thereby, the vertical shaft 41 along with the rotary shaft 43 and the clamp 44 is revolved. And the intermediate shaft 51 is revolved through the bevel gears 42 and 52 that mesh with each other. In response to this, the horizontal shaft 61 is revolved through the bevel gears 53 and 62 that mesh with each other.

Figure 6:
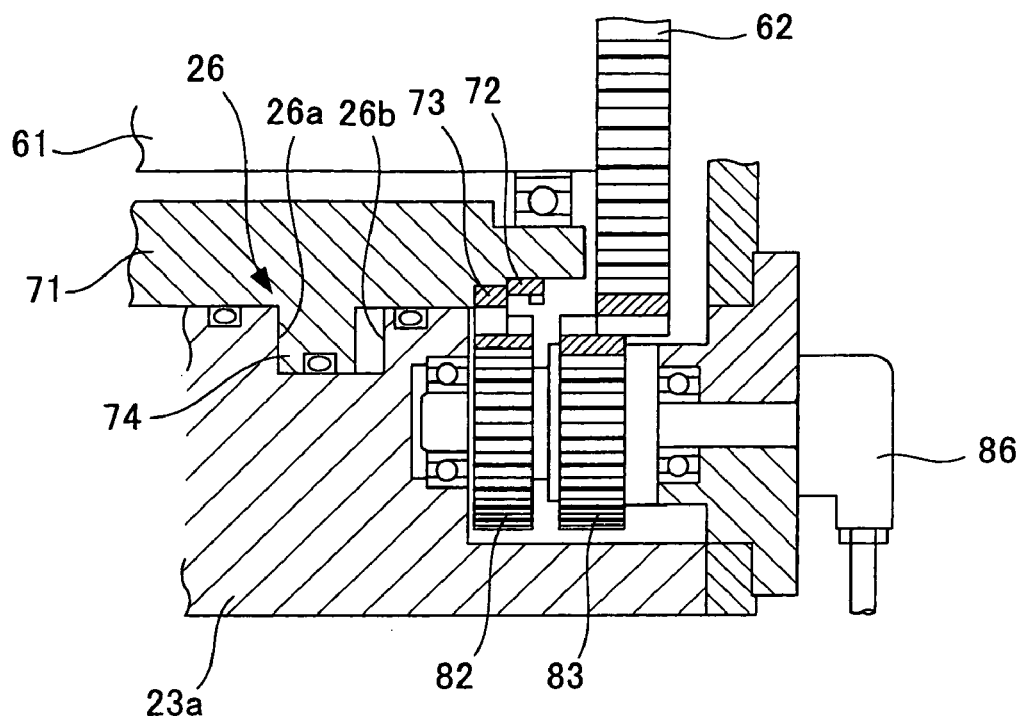
FIG. 6 shows a cross-sectional view of the attachment for a machine tool, with the attachment main spindle swiveling in the vertical plane, taken along the B-B line indicated by arrows B of FIG. 1.

At this time, because the hydraulic chamber 26b is supplied with the hydraulic pressure, the horizontal shaft 61 and the piston 71 are caused to travel to the left in FIG. 5 in an integrated manner, as shown in FIG. 5. By this, as shown in FIGS. 6 and 7, the spur gear 62 of the horizontal shaft 61 meshes with the spur gear 83 of the horizontal shaft 81 whereas the spur gear 72 of the piston 71 comes out of mesh with the internal gear 76 of the main body 23a, and the spur gear 73 of the piston 71 meshes with the spur gear 82 of the horizontal shaft 81 after changing meshing positions.

Once the horizontal shaft 61 and the piston 71 travels, this travel causes the bevel gear 63 of the horizontal shaft 61 to press the bevel gear 92 of the attachment main spindle 91 while meshing with the bevel gear 92, and thus the main body 24a of the vertical swivel part 24 is detached from the main body 23a of the horizontal swivel part 23. This puts the fixing-side gear coupling 94a and the indexing-side gear coupling 94b in the gear coupling 94 in the state of being out of mesh with each other.

Consequently, the revolution of the horizontal shaft 61 is transmitted to the horizontal shaft 81 by the mesh of the spur gear 62 of the horizontal shaft 61 with the spur gear 83 of the horizontal shaft 81, and thereafter is transmitted to the piston 71 by the mesh of the spur gear 82 of the horizontal shaft 81 with the spur gear 73 of the piston 71. As a result, the horizontal shaft 61 and the piston 71 revolve in the same direction, at the same speed, and in synchronism with each other. Because the gear coupling 94 is out of mesh, the vertical swivel part 24 swivels about the horizontal shaft 61 and the piston 71 in the vertical plane.

Subsequently, the vertical swivel part 24 swivels at a predetermined angle. Thereafter, the hydraulic chamber 26a in the cylinder 26 is supplied with the hydraulic pressure, and thus the horizontal shaft 61 and the piston 71 are caused to travel. Concurrently, the vertical swivel part 24 is caused to travel in the same direction as well, and is thus held in the state shown in FIG. 2. This meshes the fixing-side gear coupling 94a and the indexing-side gear coupling 94b in the gear coupling 94 with each other at a predetermined indexing angle. Accordingly, the vertical swivel part 24 is attached to the horizontal swivel part 23, and thus the tool T is indexed in the vertical plane.

In this respect, in the case where, as described above, the hydraulic chamber 26a in the cylinder 26 is supplied with the hydraulic pressure and thus the horizontal shaft 61 and the piston 71 are caused to travel from the right to the left in FIGS. 2 and 5, the spur gear 72 of the piston 71 is designed to come out of mesh with the internal gear 76 of the main body 23a after the spur gear 62 of the horizontal shaft 61 meshes with the spur gear 83 of the horizontal shaft 81.

In other words, the revolution of the piston 71 is always restricted before the spur gear 62 of the horizontal shaft 61 meshes with the spur gear 83 of the horizontal shaft 81 with the gear coupling being out of mesh. As a result, this restriction prevents a condition in which the piston 71 revolves freely (a neutral condition). Accordingly, even if the tool T attached to the piston 71 with the attachment main spindle 91 of the vertical swivel part 24 interposed in between is heavy in weight, the piston 71 does not revolve unintentionally so that the tool T does not revolve in the vertical plane in an unintentional direction. This prevents the tool T from being indexed wrongly.

It is a matter of course that, in the case where the hydraulic chamber 26a in the cylinder 26 is supplied with the hydraulic pressure and thus the horizontal shaft 61 and the piston 71 are caused to travel from the left to the right, the spur gear 62 of the horizontal shaft 61 is designed to come out of mesh with the spur gear 83 of the horizontal shaft 81 after the spur gear 72 of the piston 71 meshes with the internal gear 76 of the main body 23a.

It should be noted that the encoder 86 always detects the revolving angle of each of the spur gears 82 and 83, and thus the revolutions of the spur gears 82 and 83 are designed to be controlled in order that, when the spur gear 62 meshes with the spur gear 83, or when the spur gear 72 meshes with the internal gear 76, teeth tips of one gear can mesh with space of the other in each pair.

In sum, the attachment for a machine tool according to the present invention is capable of restricting the revolution of the piston 71 for swiveling the attachment main spindle 91 in the vertical plane when the attachment main spindle 91 switched from the revolving state to the state of swiveling in the vertical plane, and to accordingly prevent the tool T attached to the attachment main spindle 91 from being indexed wrongly.

The attachment for a machine tool according to the present invention is capable of restricting the revolution of the external rotary shaft for swiveling the attachment main spindle in the vertical plane when the attachment main spindle switches from a revolving state to a state of swiveling in the vertical plane.

The present invention is applicable to a positioning apparatus for positioning a movable body moving relative to a fixed body thereof.

What is claimed is:

1. An attachment for a machine tool, which is detachably attached to a nose of a main spindle of the machine tool, comprising:

an internal rotary shaft to which a revolution of the main spindle is transmitted;

an external rotary shaft, arranged coaxially with the internal rotary shaft, for revolvably supporting the internal rotary shaft in its center hole, a main body for revolvably supporting the internal and external rotary shafts;

an attachment main spindle, arranged in a direction which crosses over the axis of the internal rotary shaft, revolvably driven by a revolution of the internal rotary shaft, and a tool being detachably attached to a nose of the attachment main spindle;

a swivel part for revolvably supporting the attachment main spindle, the swivel part being swiveled by the revolutions of the internal and external rotary shafts, indexing means for enabling the main body and the swivel part to be disengageably engaged with each other, and thus for enabling swiveling the swivel part relative to the main body for indexation;

traveling means for traveling the internal and external rotary shafts in their respective axial directions;

restricting means for restricting the revolution of the external rotary shaft when the traveling means travels the internal and external rotary shafts to a first side with the indexing means engaging; and connecting means for connecting the internal and external rotary shafts to each other when the indexing means disengages after the traveling means travels the internal and external rotary shafts to a second side, wherein when the internal and external rotary shafts travel from the first side to the second side, the restricting means stops restricting the external rotary shaft after the internal and external rotary shafts are connected to each other by the connecting means.

2. The attachment for a machine tool as recited in claim 1, wherein the restricting means includes: a rotary-shaft-side gear provided to the external rotary shaft; and a main-body-side gear which is provided to the main body, and which meshes with the rotary-shaft-side gear, the connecting means is revolution transmitting gears for transmitting a revolution from an internal-rotary-shaft gear provided to the internal rotary shaft to an external-rotary-shaft gear provided to the external rotary shaft, and when the internal and external rotary shafts travel from the first side to the second side, the rotary-shaft-side gear spaces away from the main-body-side gear after the external-rotary-shaft gear meshes with the revolution transmitting gears which have meshed with the internal-rotary-shaft gear.

3. The attachment for a machine tool as recited in any one of claims 1 and 2, wherein the main body is a horizontal swivel part for swiveling the tool in the horizontal plane for indexation by revolving about a vertical shaft, and the swivel part is a vertical swivel part for swiveling the tool in the vertical plane for indexation by revolving about a horizontal shaft.

* * * * *